United States Patent
Niessen

(10) Patent No.: US 8,007,057 B2
(45) Date of Patent: Aug. 30, 2011

(54) METHOD AND SYSTEM FOR CONTROLLING THE CREEP BEHAVIOR OF A VEHICLE EQUIPPED WITH AN AUTOMATED CLUTCH

(75) Inventor: Wolfgang Niessen, Karlsruhe (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1182 days.

(21) Appl. No.: 10/733,486

(22) Filed: Dec. 11, 2003

(65) Prior Publication Data

US 2004/0140716 A1 Jul. 22, 2004

Related U.S. Application Data

(63) Continuation of application No. PCT/DE02/02071, filed on Jun. 7, 2002.

(30) Foreign Application Priority Data

Jun. 13, 2001 (DE) .................... 101 28 682

(51) Int. Cl.
*B60T 8/32* (2006.01)
*F16D 48/06* (2006.01)

(52) U.S. Cl. ...................... 303/191; 477/171

(58) Field of Classification Search .............. 303/191; 477/171
See application file for complete search history.

(56) References Cited

U.S. PATENT DOCUMENTS

| | | | | |
|---|---|---|---|---|
| 3,645,352 A | * | 2/1972 | Stark et al. ............. | 180/271 |
| 5,020,645 A | * | 6/1991 | Sasa ............................. | 477/34 |
| 5,314,050 A | * | 5/1994 | Slicker et al. ............ | 477/171 |
| 5,551,932 A | * | 9/1996 | Ishii et al. .................. | 477/168 |
| 5,632,706 A | * | 5/1997 | Kremmling et al. ........... | 477/74 |
| 5,700,227 A | * | 12/1997 | Kosik et al. .................... | 477/171 |
| 6,086,508 A | * | 7/2000 | Kosik et al. ..................... | 477/74 |
| 6,328,672 B1 | * | 12/2001 | Eguchi ............................. | 477/92 |
| 6,336,689 B1 | * | 1/2002 | Eguchi et al. .................. | 303/187 |
| RE37,572 E | | 3/2002 | Kremmling et al. ........... | 477/74 |
| 6,609,994 B2 | * | 8/2003 | Muramoto ...................... | 477/40 |
| 7,035,727 B2 | * | 4/2006 | De La Salle et al. ........... | 701/93 |

FOREIGN PATENT DOCUMENTS

| | | |
|---|---|---|
| DE | 4426260 | 2/1995 |
| EP | 0375162 | 6/1990 |
| EP | 0759514 | 2/1997 |
| WO | 0208012 | 1/2002 |

* cited by examiner

*Primary Examiner* — Bradley T King
*Assistant Examiner* — Mahbubur Rashid
(74) *Attorney, Agent, or Firm* — Davidson, Davidson & Kappel, LLC

(57) ABSTRACT

A method and system for controlling the creeping behavior of a vehicle equipped with an automated clutch (4). According to the method for controlling the creeping behavior of a vehicle equipped with an automated clutch (4), the actuation of a brake actuation element (34) is detected. In addition, a creep parameter, which influences creeping and whose magnitude influences the actuation position of the clutch (4), is modified with an increasing actuation of the brake actuation element (34) to reduce the creeping behavior.

14 Claims, 2 Drawing Sheets

METHOD AND SYSTEM FOR CONTROLLING THE CREEP BEHAVIOR OF A VEHICLE EQUIPPED WITH AN AUTOMATED CLUTCH

CROSS-REFERENCE TO RELATED APPLICATIONS

This is a continuation of PCT Application No. PCT/DE02/02071, filed Jun. 7, 2002, and claims priority to German Patent Application 101 28 692.1 filed Jun. 13, 2001. Both of these applications are hereby incorporated by reference herein.

BACKGROUND INFORMATION

The present invention relates to a method and a system for controlling the creep behavior of a vehicle equipped with an automated clutch.

Automated clutches are being increasingly used not only because of the added convenience they provide, but also because of the possible reduction in wear in motor vehicles.

FIG. 2 shows a schematic diagram of a power train of a motor vehicle equipped with an automated clutch as an example. The power train includes an internal combustion engine 2, a clutch 4, and a transmission 6, which is connected to driven wheels (not shown) via a drive shaft 8. Transmission 6 is an automated manual shift transmission, for example, a taper disk belt transmission having a continuously variable transmission ratio, or a conventional automatic transmission having planetary gears. A shifting device 9, which is controllable from a selector device 10 using a selector lever 12 via a control unit 14 in a known manner, is used to actuate or shift transmission 6. It is understood that the selector device may also have a different design, for example, as a conventional shift stick (H gate) or as a lever having jog positions for shifting up and down. Clutch 4 is a friction disk clutch, for example, of a design which is known per se, having an actuating device 16, which may have a hydraulic, electric, electrohydraulic, or other known design.

The sensors contained in the power train, such as a pressure sensor 18 for detecting the intake pressure of engine 2, a rotational speed sensor 20 for detecting rotational speed $n_M$ of the engine crankshaft, a sensor 22 for detecting position α of an accelerator pedal 24, a sensor 26 for detecting the position of selector lever 12, and an additional rotational speed sensor 28 for detecting the rotational speed of drive shaft 8, are connected to the inputs of control unit 14.

Control unit 14, having a microprocessor with respective memories 29, contains characteristic maps and programs in an essentially known manner, which control actuators, such as a load adjustment element 30 for adjusting the load of engine 2, actuating device 16, clutch 4, and shifting device 9 of transmission 6, and other consumers 31 driven directly or indirectly by the engine such as a generator, a pump, or a heating element, etc. The individual actuators may be designed in such a way that their position is immediately known in control unit 14, for example, as stepping motors, or additional position transducers, such as position transducer 32 for detecting a parameter relevant to position $s_K$ of clutch 4, may be provided.

A brake pedal 34 is connected, via a hydraulic line 35, to a braking pressure control unit 36, which is connected to vehicle brakes 38 via additional hydraulic lines. An additional electronic control unit 40, which is connected to control unit 14 via a data line 42, is provided for controlling brake pressure control unit 36. The pressure in hydraulic line 35 generated by the actuation of brake pedal 34 is detected by a pressure sensor 44 connected to control unit 14. Control unit 40 controls the brakes, for example, in an essentially known manner, in such a way that locking of a wheel is prevented (ABS system) and/or that the vehicle does not skid unintentionally (vehicle stability system). For this purpose, additional sensors (not shown) are provided, whose signals are analyzed in control unit 40, possibly together with signals delivered by control unit 14, so that the individual vehicle brakes and, if present, load adjustment element 30, may be triggered as needed. The distribution of hardware and software between devices 14 and 34, as well as the connections of the sensors and actuators are adapted to the particular conditions.

The design and function of the above-described system are essentially known and will therefore not be described in detail. Depending on the driver's intent communicated via accelerator pedal 24 and the intent of selecting a driving program or a driving direction communicated via selector lever 12, load adjustment element 30, actuating device 16, and shifting device 9 are actuated in a mutually coordinated manner as a function of the signals delivered by the sensors in such a way that comfortable and/or economical driving results.

A characteristic curve, for example, which determines a setpoint position of clutch 4 set by actuating device 16 as a function of the torque to be transmitted by clutch 4 is stored in the memory of control unit 14 to actuate clutch 4. For reasons of control quality, clutch wear, and power consumption of the actuating device, the clutch torque to be transmitted at a given time should not exceed the absolutely necessary value. The required torque to be transmitted results from the driver's intent, i.e., the position of accelerator pedal 24 and, for example, from the load on internal combustion engine 2, detected by sensor 18, and possibly from additional operating parameters such as the rotational speed of engine 2, etc.

The characteristic curve stored in control unit 14, which provides the desired path of the clutch's final control element moved by actuating device 16 as a function of the calculated torque to be transmitted, has a decisive influence on comfortable start and comfortable shifting. The characteristic curve changes in the short-term due to temperature changes, for example, and in the long-term over the lifetime of the clutch due to wear, for example. It is, therefore, constantly updated, i.e., readjusted, according to a wide variety of strategies, to the prevailing operating conditions.

One important function which is made possible by an automated clutch is the vehicle creep, which makes it possible for the vehicle to move slowly when a forward or reverse gear is selected and the engine is running, without actuating the accelerator pedal. The driver is thus able to maneuver the vehicle more easily by operating only the brake pedal to stop the creeping vehicle. In creeping, the clutch is controlled in general in such a way that it is engaged as long as it transmits a certain creep torque, for example, 10 Nm. This creep torque is controlled, for example, by control unit 14 slowly engaging clutch 4 using actuating device 16 with the transmission in gear and the gas pedal not actuated, while engine 2 is controlled via load adjustment element 30 of engine 2 at, as far as possible, a constant speed of engine 2 in such a way that it generates the predefined torque on the clutch. It is understood that the power consumption of any additional consumers driven by the engine is taken into consideration.

One peculiar feature of the known creep behavior of vehicles is that the driver is not able to directly influence the creep, which impairs comfort and requires a high degree of skill from the driver when, for example, he must maneuver on a sloping roadway.

BRIEF SUMMARY OF THE INVENTION

An object of the present invention is to provide a method and a system for controlling the creep behavior of a vehicle equipped with an automated clutch, in which it is possible to further enhance comfort in creep operation.

The present invention provides a method for controlling the creep behavior of a vehicle equipped with an automated clutch, wherein the actuation of a brake actuating element is detected and a creep parameter influencing the creep, whose magnitude influences the actuating position of the clutch, is modified when the brake actuating element is increasingly actuated in such a way that the extent of creep is reduced.

Using the method according to the present invention, it is achieved that the driver is able to directly influence the position of the clutch and thus the creep behavior by actuating the brake, so that the creep torque transmitted by the clutch during creep states may vary within broad limits. Furthermore, the clutch is spared, because the creep torque is weakened with increasing actuation of the brake, and the clutch, i.e., the engine, does not work entirely against the actuated brakes.

The present invention also provides a system for controlling the creep behavior of a vehicle equipped with an automated clutch, containing sensors for detecting operating parameters of a vehicle engine, a sensor for detecting an operating state of a vehicle braking device, a power adjustment actuator for controlling the power output of the engine, a clutch actuator for controlling the clutch, a brake actuating element, and an electronic control device having memory devices and a microprocessor, connected to the sensors and actuators, the control device controlling the actuators according to the analysis of the sensor signals for carrying out the method according to the present invention.

BRIEF DESCRIPTION OF THE DRAWINGS

The present invention is elucidated below on the basis of the schematic drawing used as an example and further details.

DETAILED DESCRIPTION

Figure 2:
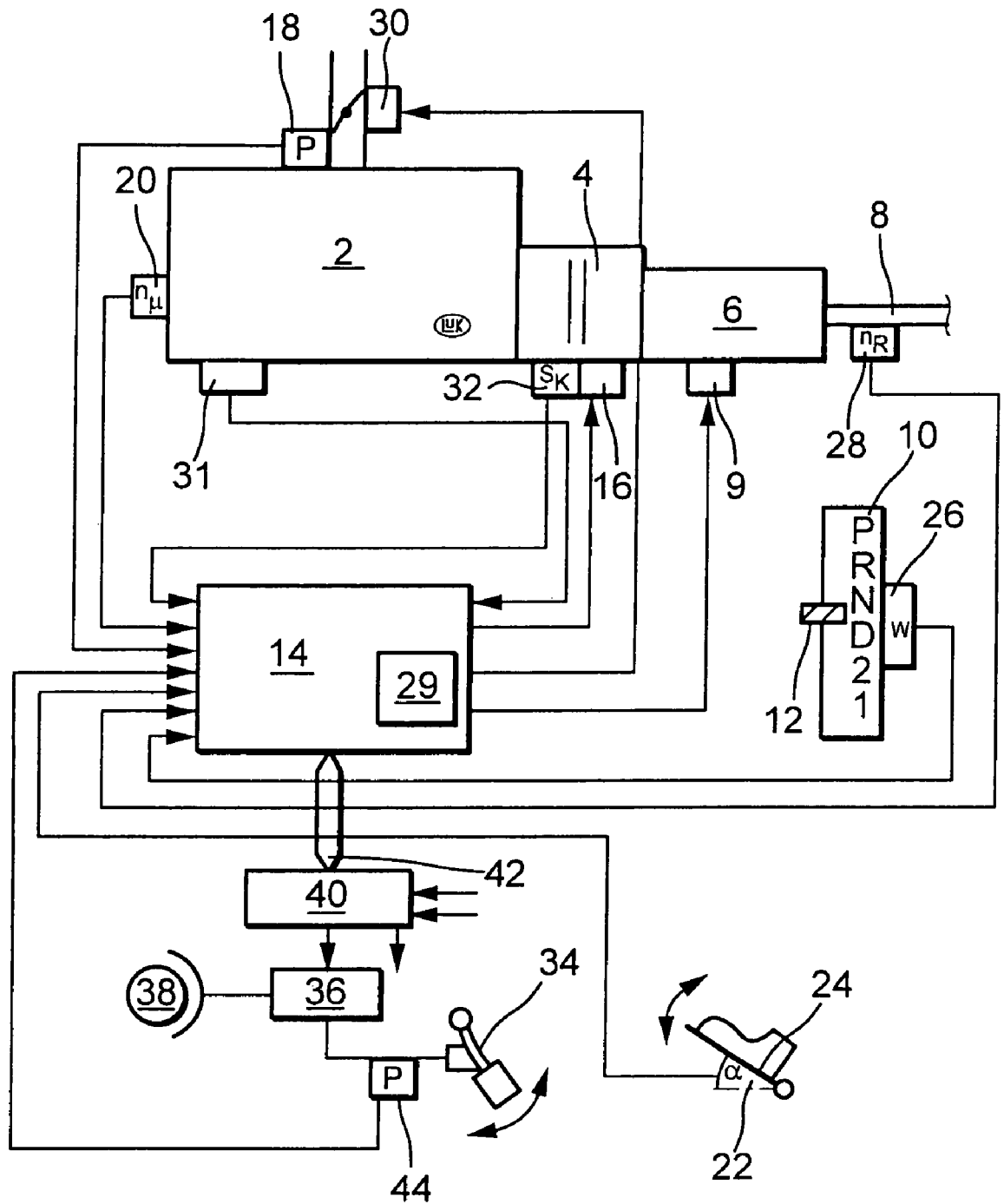
FIG. 2 represents a schematic drawing, described previously, of a prior art vehicle power train having a controller.

As an example, the present invention is elucidated below using a power train designed as in FIG. 2 described previously.

A characteristic curve which provides the setpoint value of a creep parameter $KP_S$ as a function of a brake actuation parameter B, i.e., $KP_S=f(B)$, is stored in control unit 14. Creep parameter KP is a variable which defines the "extent of creep" of the vehicle. Function f is such that $KP_S$ decreases as brake actuation B increases, i.e., when the brake is not being actuated, the vehicle creeps strongly by itself, and the extent of creep diminishes with increased brake actuation in that, for example, the clutch is gradually disengaged or the engine is controlled in such a way that its torque is reduced.

The measure of brake actuation B may be given, for example, by pressure p detected by sensor 44 or by a force with which the brake pedal is actuated or the path by which the brake pedal is displaced (the corresponding sensors are not shown in the drawing). Taking the force on the brake pedal or the path of actuation of the brake pedal as the variable describing the brake actuation is advantageous in electronic or electric brake systems where, like in electronic gas pedals, actuation of the brake itself is separated from the operation of the brake pedal. The actuation of a hand brake lever, not shown, may also be used as a variable describing the brake actuation.

The creep parameter describing the creep behavior of the vehicle may be of different types. For example, the creep torque transmitted by clutch 4 may be used as the creep parameter, the engine then being kept at a constant speed using, for example, an idling control device (not shown), and the clutch being controlled by actuating device 16 in such a way that it transmits the torque predefined by the brake actuation. The torque that is transmitted when the brake is not actuated may be defined by a value such that the vehicle creeps forward even if it is standing on an upward slope.

It is particularly advantageous if the vehicle speed is used as the creep parameter, which, to be measurable with sufficient accuracy even at very low speeds, is advantageously detected by a sensor which detects the rotation of an input shaft of transmission 6. This rotation is convertible directly into the vehicle speed if the transmission ratio of the transmission is known. Rotational speed sensor 28, which in FIG. 2 detects the rotational speed of output shaft 8 of the transmission, may then be omitted and is replaced by a corresponding sensor which detects the rotational speed of the input shaft of transmission 6. Because of the higher speed of the transmission input shaft compared to the rotational speed of the vehicle's wheels, it is advantageous to detect the speed of the transmission input shaft rather than using the wheel speed sensors usually present in vehicles equipped with ABS systems.

Figure 1:
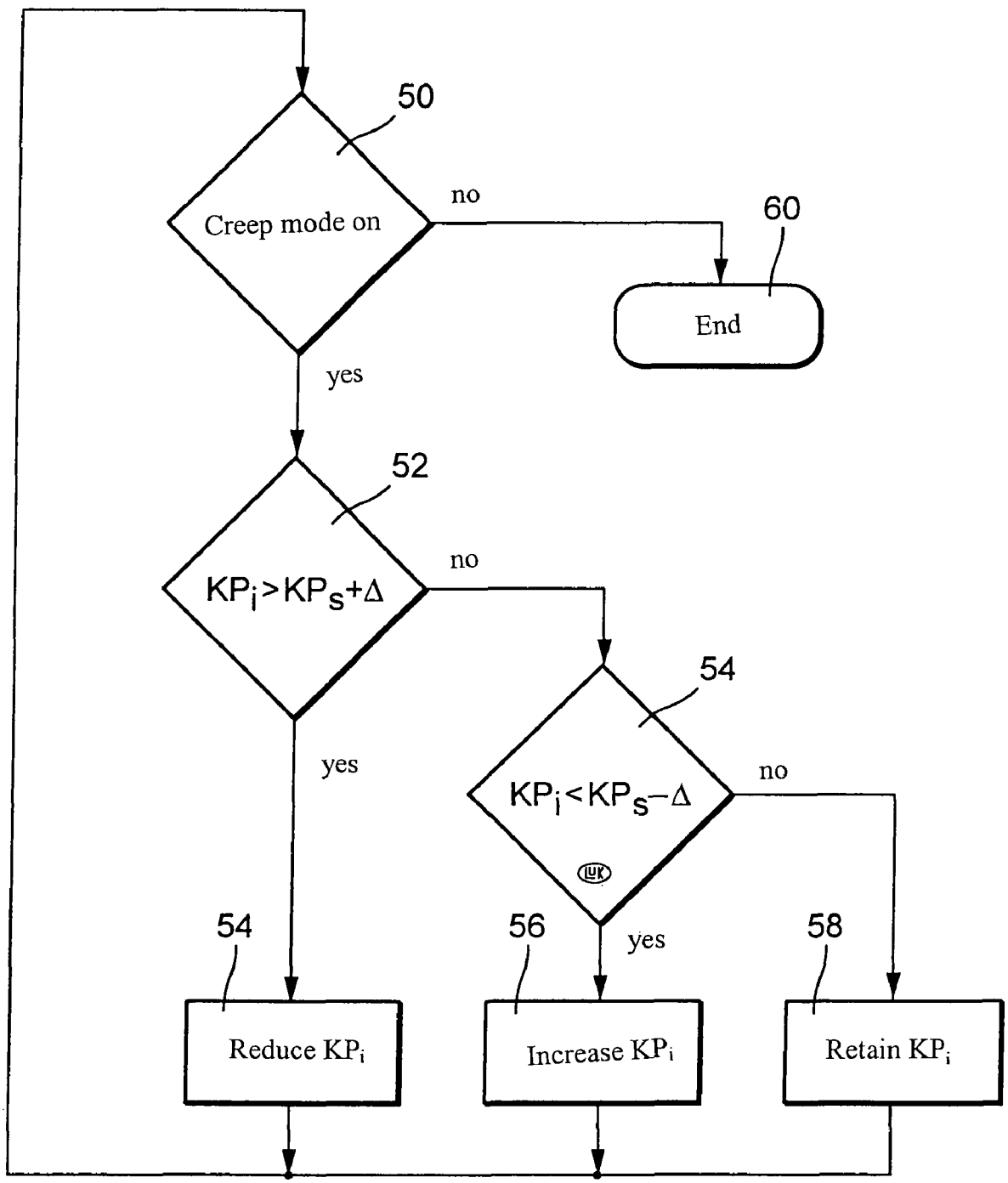
FIG. 1 represents a flow chart for elucidating a creep strategy.

An example of the creep control by the driver is elucidated on the basis of FIG. 1.

Initially, it is determined in step 50 whether the vehicle is in the creep mode. The creep mode is defined, for example, by the fact that the engine is running, gas pedal 24 is not being actuated, and the forward gear having the highest transmission ratio or the reverse gear is engaged.

If the vehicle is in the creep mode, it is determined in step 52 whether clutch 4, i.e., engine 2, is controlled in such a way that instantaneous creep parameter $KP_i$ is greater than, for example, setpoint creep parameter $KP_S$ dependent on the actuation of brake pedal 34 (the pressure detected by sensor 44, for example) plus a value Δ which is advantageous for the control, i.e., whether the condition $$KP_i > KP_s + \Delta$$

is met. If this is the case, in step 54 the clutch is gradually disengaged and/or the engine torque is reduced, so that $KP_i$ is reduced by a predefined value, for example. The system then jumps back to step 50.

If it is determined in step 52 that the condition is not met, it is determined, in step 54, whether the condition $KP_i < KP_s - \Delta$ is met. If this is the case, $KP_i$ is increased in step 56, and the system jumps to step 50. If it is determined in step 54 that the condition checked there is not met, engine and/or clutch control is maintained in step 58, whereupon the system jumps to step 50. If it is determined in step 50 that the creep mode is no longer present, for example, due to the fact that the accelerator pedal has been actuated, the neutral gear has been selected, or, for example, the brake pedal has been actuated using a force greater than the threshold value, the system jumps to end step 60, where the creep mode is terminated.

A simple function $KP_i=f(B)$ reads, for example:

$$v_{setpoint}=((B_{max}-B)/B_{max})\times v_{max} \text{ for } B<B_{max} \text{ and}$$

$$v_{setpoint}=0 \text{ for } B>B_{max}.$$

Here, $v_{max}$ is the maximum creep speed (the brakes not being actuated). If brake actuation B exceeds the value $B_{max}$, the creep speed should be reduced to zero. The torque transmitted via the clutch is controlled by control unit 14 in such a way that the desired speed dependent on the brake actuation is quickly set without control vibrations. In this way, the vehicle exhibits a creep behavior which allows it to maneuver very comfortably under a great variety of conditions.

The above-mentioned method in which the creep speed is taken as the creep parameter has the following advantages:

The engine torque available at the clutch, which is difficult to measure accurately, does not need to be determined directly.

Displacements of the clutch measuring point, which always occur, do not need to be taken into account directly.

The strategy is easily usable even on an upward slope, as long as the engine is capable of delivering sufficient torque within the controlled range, e.g., at its idling speed. Otherwise, the control range of the engine may be extended by activating not only the idling control system, but also the setting of a load adjustment element.

The above-described method according to the present invention may be modified in many ways. For example, different characteristic curves, setpoint values, and limiting values may be used for a forward and a reverse gear.

What is claimed is:

1. A method for controlling creep behavior of a vehicle equipped with an automated clutch, comprising:
    detecting actuation of a brake actuating element, a creep parameter influencing a creep of the vehicle, an actuating position of the automated clutch being a function of the creep parameter; and
    controlling the creep parameter using a vehicle speed setpoint so that when the brake actuating element is increasingly actuated, the vehicle speed is reduced.

2. The method as recited in claim 1 wherein the detecting step includes detecting an actuation force on the brake pedal.

3. The method as recited in claim 1 wherein the detecting step includes detecting a pressure in a brake system.

4. The method as recited in claim 1 wherein the detecting step includes detecting a path of the brake actuating element.

5. The method as recited in claim 1 wherein the speed of the vehicle is controlled so as to vary linearly with actuation of the brake element.

6. The method as recited in claim 1 wherein the speed of the vehicle is controlled so that the speed of the vehicle equals (BMAX-B/BMAX)*VMAX for B<BMAX and zero for B>BMAX, where B is the brake actuation, BMAX is a maximum creep brake actuation, and VMAX is the maximum vehicle creep when the brake is not actuated.

7. The method as recited in claim 1 wherein the speed of the vehicle is determined using a sensor sensing a rotational speed of an input shaft to a transmission, the sensor being downstream of the clutch.

8. The method as recited in claim 7 wherein the speed of the vehicle is determined using the transmission ratio.

9. A system for controlling the creep behavior of a vehicle equipped with an automated clutch, the system comprising:
    engine sensors for detecting operating parameters of a vehicle engine;
    a brake sensor for detecting an operating state of a vehicle braking device;
    a power adjustment actuator for controlling a power output of the engine;
    a clutch actuator for controlling the clutch;
    a brake actuating element; and
    an electronic control device having memory devices and a microprocessor, the electronic control device connected to the engine sensors, brake sensor, clutch actuator and brake actuating element, the control device controlling the clutch actuator according to analysis of the brake sensor signals so as to control creep behavior according to the method as recited in claim 1.

10. The system as recited in claim 9 wherein the engine sensors includes a first sensor for detecting a vehicle speed.

11. The system as recited in claim 10 wherein the first sensor detects a rotational speed of an input shaft of a transmission situated downstream from the clutch in order to detect the vehicle speed.

12. A system for controlling the creep behavior of a vehicle equipped with an automated clutch, the system comprising:
    a brake actuating element;
    a brake sensor sensing actuation of the brake actuating element;
    a clutch actuator for controlling the clutch;
    a speed sensor detecting a rotational speed of a transmission input shaft downstream of the clutch; and
    an electronic control device having memory devices and a microprocessor, the electronic control device connected to the brake sensor and clutch actuator, the control device receiving an input from the speed sensor and controlling a speed of the vehicle using a vehicle speed setpoint so as to reduce vehicle creep as the brake actuating element is increasingly actuated.

13. A method for controlling creep behavior of a vehicle equipped with an automated clutch, comprising:
    detecting actuation of a brake actuating element; and
    controlling the automated clutch to attain a vehicle speed setpoint, the vehicle speed setpoint being reduced as the brake actuating element is increasingly actuated.

14. The method as recited in claim 13 further comprising determining a vehicle speed as a function of an input shaft to a transmission.

* * * * *